S. T. APPLEGATE.
INDICATOR.
APPLICATION FILED DEC. 9, 1911
1,024,051.
Patented Apr. 23, 1912.
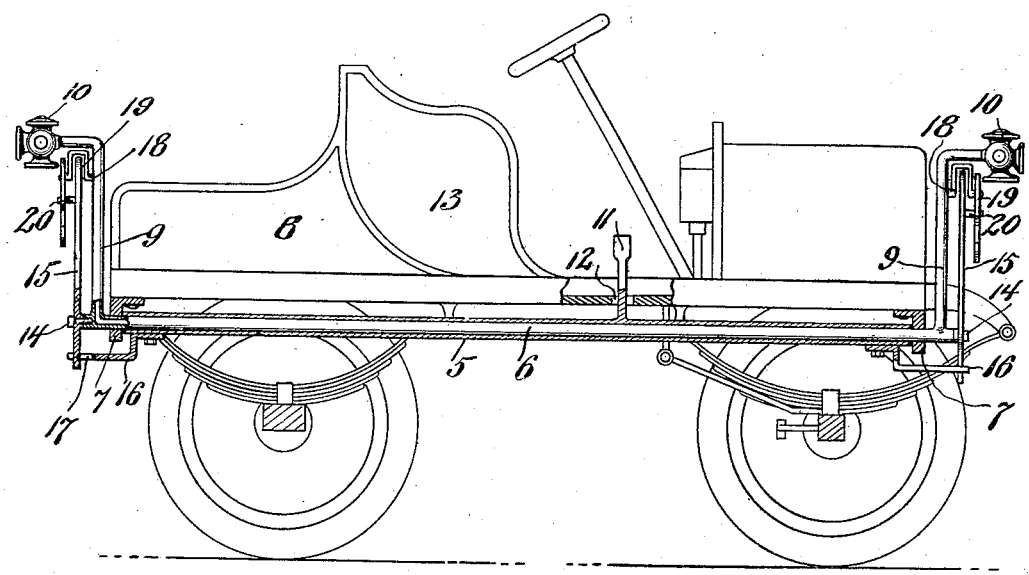
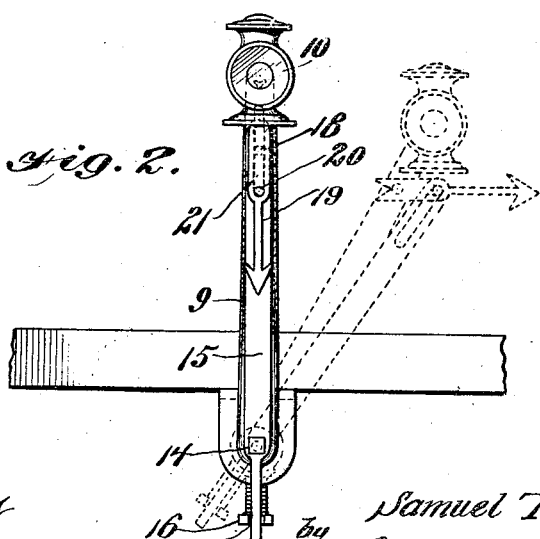
WITNESSES
H. C. Barry
E. F. Camp
INVENTOR
Samuel T. Applegate
by May R. Schmidt
Attorney

UNITED STATES PATENT OFFICE.

SAMUEL T. APPLEGATE, OF LOUISVILLE, KENTUCKY.

INDICATOR.

1,024,051.　　　　Specification of Letters Patent.　　Patented Apr. 23, 1912.

Application filed December 9, 1911. Serial No. 664,855.

*To all whom it may concern:*

Be it known that I, SAMUEL T. APPLEGATE, a citizen of the United States, residing at Louisville, in the county of Jefferson and State of Kentucky, have invented certain new and useful Improvements in Indicators, of which the following is a specification.

This invention is a steering indicator for automobiles and other vehicles to indicate the direction in which the driver is going to turn, and its object is to provide a simple and efficient device of this kind which will operate in the daytime as well as at night.

The invention also has for its object to provide a device of the kind stated which can be easily operated, and which is so constructed that it may be applied to the automobile or other vehicle without changing or modifying the structure thereof.

With these objects in view, the invention consists in a novel construction and arrangement of parts to be hereinafter described and claimed.

In the accompanying drawing forming a part of this specification—Figure 1 is an elevation, partly in section, showing the application of the invention. Fig. 2 is a face view of the indicator.

Referring specifically to the drawing, 5 denotes a tube which is loosely mounted on another tube 6, which latter is supported by bearing brackets 7 on the bottom of the body 8 of the automobile or other vehicle. The tube 6 is free to rock in its bearings, and has at its ends upstanding portions 9 carrying lamps 10 at their extremities. The length of the tube 6 is such that the parts 9 are located, respectively, in front and behind the body 8, which correspondingly positions the lamps 10. The tubes 5 and 6 extend horizontally in the direction of the length of the vehicle. The tube 5 is free to rock on the tube 6, and is adapted to be operated by the driver's foot by means of a stem 11 which extends upward from said tube 5 and passes through a slot 12 in the floor of the body 8. The upper end of the stem is located in front of the seat 13 so as to be within easy reach of the driver's foot.

Each of the parts 9 carries an indicator which is constructed and arranged as follows: To the lower end of the part 9 is fulcrumed, intermediate its ends, as indicated at 14, a lever 15, said lever being arranged to swing in a vertical plane transversely of the vehicle. To the tube 5 is fastened a horizontal arm 16 having a longitudinal slot 17 into which the lower reduced end of the lever 15 loosely extends. It will therefore be evident that when the tube 5 is rocked, the lever 15 will be swung on its fulcrum 14. The upper end of the part 9 carries a stud 18 on which is pivoted, to swing in a vertical plane, an arrow or other suitable indicator 19 carrying an outstanding pin or stud 20 which extends loosely into a slot 21 in the upper end of the lever 15. The parts 6 and 9 are tubular in order that the gas tubes for the lamps 10 may be mounted therein; or if electric lamps are employed the current wires will be inclosed by said parts.

The operation is as follows: Assuming that the driver wishes to indicate that he is about to turn the vehicle to the right, he pushes the stem 11 to the right with his foot, whereupon the tube 5 is rocked, and through the arm 16 the lever 15 is caused to swing on its fulcrum 14. The upper end of the lever swings to the right and through the pin 20 swings the indicator 19 into horizontal position to point to the right also. Normally, the lamp-supporting parts 9 and the indicator 19 are perpendicular, the latter pointing downward. After the indicator comes to the position stated, a further swing of the lever 15 to the right swings the part 9 in that direction also, thus swinging the lamp to the right and at the same time carrying the indicator bodily in that direction. Fig. 2 shows the position the parts assume upon being swung to the right, and as they are located both in front and to the rear of the vehicle, the direction in which it is about to turn will be clearly indicated to an approaching vehicle or one behind. If a turn to the left is to be made, the driver pushes the stem in that direction, whereupon the lamps and the indicators are swung to the left.

The device herein described is devoid of complicated parts to get out of order, and it is therefore efficient and reliable in operation, and it can be easily operated. The device can also be readily applied to any ordinary automobile or other vehicle without altering or modifying the structure thereof. The indicator has a dark background and is illuminated at night by the lamps.

The preferred embodiment of the invention has been shown, but it will be understood that various minor changes in the structural details may be made without a departure from the spirit or scope of the invention.

I claim:

1. The combination with a vehicle; of a lamp-supporting member mounted thereon to rock transversely of the vehicle, an indicator and a lever pivoted to said member to swing transversely of the vehicle, an operating connection between the lever and the indicator, and means for operating the lever.

2. The combination with a vehicle; of a lamp-supporting member mounted thereon to rock transversely of the vehicle; an indicator and a lever pivoted to said member to swing transversely of the vehicle, said lever having a longitudinal slot, a pin extending from the indicator into said slot, and means for operating the lever.

3. The combination with a vehicle; of a lamp-supporting member mounted thereon to rock transversely of the vehicle, an indicator and a lever pivoted to said member to swing transversely of the vehicle, an operating connection between the lever and the indicator, a member mounted to rock transversely of the vehicle and having a slot into which the lever extends, and means for actuating the last-mentioned member.

4. The combination with a vehicle; of a horizontal member mounted thereon to rock transversely of the vehicle, and having a vertical lamp-support, a tubular member mounted on said horizontal member and free to rock thereon, means for actuating said tubular member, a slotted arm carried by the tubular member, a lever and an indicator pivoted to the aforesaid lamp-support to swing ansversely of the vehicle, one end of the lever extending into the slot of the aforesaid arm, and its other end being slotted, and a pin extending from the indicator into the slot of the lever.

5. The combination with a vehicle; of a horizontal member mounted thereon to rock transversely of the vehicle, and having a vertical lamp-support, a tubular member mounted on said horizontal member and free to rock thereon, means for actuating said tubular member, a slotted arm carried by the tubular member, a lever and an indicator pivoted to the aforesaid lamp-support to swing transversely of the vehicle, one end of the lever extending into the slot of the aforesaid arm, and an operating connection between the lever and the indicator.

In testimony whereof I affix my signature in presence of two witnesses.

SAMUEL T. APPLEGATE.

Witnesses:
GEORGE W. KOEHLER,
JAMES HALPIN O'REILLY.

---

Copies of this patent may be obtained for five cents each, by addressing the "Commissioner of Patents, Washington, D. C."